(12) United States Patent
Tseng et al.

(10) Patent No.: US 11,997,026 B2
(45) Date of Patent: May 28, 2024

(54) SAFE PORT REMOVAL

(71) Applicant: Nokia Solutions and Networks Oy, Espoo (FI)

(72) Inventors: Yu-Chia Tseng, Massy (FR); Gopalasingham Aravinthan, Nozay (FR); Bogdan Uscumlic, Les Ulis (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/208,183

(22) Filed: Mar. 22, 2021

(65) Prior Publication Data

US 2022/0303229 A1    Sep. 22, 2022

(51) Int. Cl.
*H04L 41/12*   (2022.01)
*H04L 12/46*   (2006.01)
*H04L 49/00*   (2022.01)

(52) U.S. Cl.
CPC .......... *H04L 49/70* (2013.01); *H04L 12/4679* (2013.01); *H04L 41/12* (2013.01)

(58) Field of Classification Search
CPC ............................ H04L 41/12; H04L 12/4679
USPC ............................................................. 718/1
See application file for complete search history.

(56) References Cited

U.S. PATENT DOCUMENTS

| | | | |
|---|---|---|---|
| 2004/0085894 A1 | 5/2004 | Wang et al. | |
| 2008/0137130 A1* | 6/2008 | Ferlitsch | G06Q 30/02 358/1.15 |
| 2013/0151646 A1* | 6/2013 | Chidambaram | H04L 47/6215 709/213 |
| 2013/0329547 A1 | 12/2013 | Takase et al. | |
| 2014/0286358 A1* | 9/2014 | Mahvi | H04L 63/1458 370/509 |
| 2016/0205048 A1 | 7/2016 | Zhu et al. | |

FOREIGN PATENT DOCUMENTS

EP    3618351 A1    3/2020

OTHER PUBLICATIONS

Jain, S., et al., "B4: Experience with a Globally-Deployed Software Defined WAN," SIGCOMM 2013, Aug. 12-16, 2013, 12 pages.

(Continued)

*Primary Examiner* — Sibte H Bukhari
(74) *Attorney, Agent, or Firm* — Tong, Rea, Bentley & Kim, LLC

(57) ABSTRACT

Various example embodiments for supporting safe port removal are presented. Various example embodiments for supporting safe port removal may be configured to support safe port removal for a port of a virtual switch. Various example embodiments for supporting safe port removal for a port of a virtual switch may be configured to support safe removal of the port of the virtual switch such that the port is no longer available for use on the virtual switch. Various example embodiments for supporting safe port removal for a port of a virtual switch may be configured to support safe removal of the port of the virtual switch by performing separate logical and physical shutdowns of the port and performing one or more functions for the port (e.g., rejecting link discovery packets, continuing to handle data packets, and so forth) between the logical and physical shutdowns of the port.

12 Claims, 7 Drawing Sheets

(56) References Cited

OTHER PUBLICATIONS

Onos Network Project, "Network Discovery," printed from https://wiki.onosproject.org/display/ONOS/Network+Discovery on Jan. 12, 2022, 3 pages.

Open Daylight, "OpenFlow Plugin Operation," printed from https://docs.opendaylight.org/projects/openflowplugin/en/latest/users/operation.html on Jan. 12, 2022, 38 pages.

Azzouni, A et al., "Limitations of OpenFlow Topology Discovery Protocol," 16th Annual Mediterranean Ad Hoc Networking Workshop, Jun. 30, 2017, 5 pages.

Open Networking Foundation, "OpenFlow Switch Specification," Version 1.4.0 (Wire Protocol 0x05), Oct. 14, 2013, 206 pages.

Kozat, U. C., et al., "On Diagnosis of Forwarding Plane via Static Forwarding Rules in Software Defined Networks," IEEE Conference on Computer Communications, IEEE Infocom 2014, Toronto Canada, May 2014, 10 pages.

Lee, S. S. W., et al., "Path Layout Planning and Software Based Fast Failure Detection in Survivable OpenFlow Networks," 10th International Conference on the Design of Reliable Communication Networks (DRCN), Belgium, Apr. 2014, 8 pages.

Lee, S. S. W., et al., "Software-Based Fast Failure Recovery for Resilient OpenFlow Networks," 7th International Workshop on Reliable Networks Design and Modeling (RNDM), Munich Germany, Oct. 2015, 7 pages.

Sminesh, C. N. et al., "Flow Monitoring Scheme for Reducing Congestion and Packet Loss in Software Defined Networks," 4th International Conference on Advanced Computing and Communication Systems (ICACCS), Coimbatore, India, Jan. 2017, 5 pages.

Van Andrichem, et al., "Fast Recovery in Software-Defined Networks," 3rd European Workshop on Software Defined Networks, Budapest, Hungary, Sep. 2014, 6 pages.

Gyllstrom, D. et al., "Recovery From Link Failures in a Smart Grid Communication Network Using OpenFlow," 2014 IEEE Conference on Smart Grid Communications 2014, Venice, Italy, Nov. 2014, 6 pages.

Yang, T. W., et al., "Failure Detection Service with Low Mistake Rates for SDN Controllers," 18th Asia-Pacific Network Operations and Management Symposium (APNOMS), Kanazawa, Japan, Oct. 2016, 6 pages.

Staessens, D., et al., "Software Defined Networking: Meeting Carrier-Grade Recovery Requirements," 2018 IEEE Workshop on Local & Metropolitan Area Networks (LANMAN), Oct. 2011, 6 pages.

Lin, Y. D., "Fast Failover and Switchover for Link Failures and Congestion in Software Defined Networks," 2016 IEEE International Conference on Communications (ICC), Kuala Lumpur, Malaysia, May 2016, 6 pages.

Azzouni, A. et al., "sOFTDP: Secure and Efficient OpenFlow Topology Discovery Protocol," NOMS 2018, 2018 IEEE/IFIP Network Operations and Management Symposium, Taipei, Taiwan, Apr. 2018, 7 pages.

Kim, S. et al., "BFD-Based Link Latency Measurement in Software Defined Networking," 13th International Conference on Network and Service Management (CNSM), Tokyo, Japan, Nov. 2017, 6 pages.

Kempf, J. et al., "Scalable Fault Management for OpenFlow," 2012 IEEE International Conference on Communications (ICC), Ottawa, Canada, Jun. 2012, 5 pages.

Pakzad, F. et al., "Efficient Topology Discovery in OpenFlow-Based Software Defined Networks," 2014 8th International Conference on Signal Processing and Communication Systems (ICSPCS) 2014, 33 pages.

Tarnaras, G., et al., "SDN and ForCES Based Optimal Network Topology Discovery," Proceedings of the 215 1st IEEE Conference on Network Softwarization (NetSoft), London, UK, Apr. 2015, 6 pages.

Yang, L., et al., "Forwarding and Control Element Separation (ForCES) Framework," IEEE, RFC 3746, Apr. 2004, 40 pages.

Extended European Search Report mailed in corresponding EP Application No. 22159071.4 dated Aug. 3, 2022, 10 pages.

Lou, M. et al., "VirtualTransits: a Flexible Platform for Network Virtualization across Data Centers," 2014 IEEE 6th International Conference on Cloud Computing Technology and Science, IEEE Computer Society, Dec. 15, 2014, pp. 563-570.

\* cited by examiner

FIG. 3

```
struct ofp_port_status {
    struct ofp_header header;
    uint8_t reason; /* One of OFPPR_*. */
    uint8_t pad[7]; /* Align to 64-bits. */
    struct ofp_port desc;
};
```

OpenFlow Specification "ofp_port_status"

```
/* What changed about the physical port */
enum ofp_port_reason {
    OFPPR_ADD = 0,    /* The port was added. */
    OFPPR_DELETE = 1, /* The port was removed. */
    OFPPR_MODIFY = 2, /* Some attribute of the port has changed. */
};
```

OpenFlow Specification "ofp_port_reason"

```
1513  void
1514  connmgr_send_port_status(struct connmgr *mgr, struct ofconn *source,
1515                           const struct ofputil_phy_port *old_pp,
1516                           const struct ofputil_phy_port *new_pp,
1517                           uint8_t reason)
1518  {
1519      /* XXX Should limit the number of queued port status change messages. */
1520      struct ofputil_port_status new_ps = { reason, *new_pp };
1521
1522      struct ofconn *ofconn;
1523      LIST_FOR_EACH (ofconn, connmgr_node, &mgr->conns) {
1524          if (ofconn_receives_async_msg(ofconn, OAM_PORT_STATUS, reason)) {
```

OVS source code: func "connmgr_send_port_status(...)" in "ofproto/connmgr.c"

```
2513  /* Removes 'ofport' from 'p' and destroys it. */
2514  static void
2515  ofport_remove(struct ofport *ofport)
2516  {
2517      struct ofproto *p = ofport->ofproto;
2518      bool is_mtu_overridden = ofport_is_mtu_overridden(p, ofport);
2519
2520      connmgr_send_port_status(ofport->ofproto->connmgr, NULL,
2521                               NULL, &ofport->pp, OFPPR_DELETE);
2522      ofport_destroy(ofport, true);
2523      if (!is_mtu_overridden) {
2524          update_mtu_ofproto(p);
2525      }
2526  }
```

OVS source code: func "ofport_remove(...)" in "ofproto/ofproto.c"

OVS NOTIFIES CONTROL PLANE THAT PORT IS LOGICALLY REMOVED WITH OPENFLOW "OFP_PORT_STATUS" MESSAGE

OVS PHYSICALLY REMOVES PORT

FIG. 4

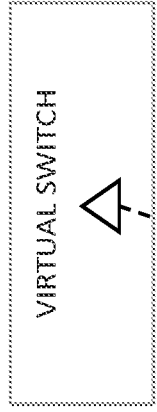

VIRTUAL SWITCH

```
2513    /* Removes 'ofport' from 'p' and destroys it. */
2514    static void
2515    ofport_remove(struct ofport *ofport)
2516    {
2517        struct ofproto *p = ofport->ofproto;
2518        bool is_mtu_overridden = ofport_is_mtu_overridden(p, ofport);
2519
2520        connmgr_send_port_status(ofport->ofproto->connmgr, NULL, NULL, &ofport->pp, OFPPR_DELETE);
2521
2522        ofport_destroy(ofport, true);
2523        if (!is_mtu_overridden) {
2524            update_mtu_ofproto(p);
2525        }
2526    }
```

OVS source code: func "ofport_remove(...)" in "ofproto/ofproto.c"

SAFE PORT SHUTDOWN FUNCTION : (1) MAY BE ADDED BETWEEN THE TWO FUNCTIONS "CONNMGR_SEND_PORT_STATUS()" AND "OFPORT_DESTORY()" IN "OFPROTO/OFPROTO.C" AND (2) MAY HANDLE THE PORT UNTIL NO MORE PACKETS NEED THIS PORT AND THEN PROCEED TO THE FUNC "OFPORT_DESTORY"

US 11,997,026 B2

SAFE PORT REMOVAL

TECHNICAL FIELD

Various example embodiments relate generally to communication systems and, more particularly but not exclusively, to controlling ports in communication systems.

BACKGROUND

In various communication networks, various communications technologies may be used to support various types of communications.

SUMMARY

In at least some example embodiments, an apparatus includes at least one processor and at least one memory including a set of instructions, wherein the set of instructions is configured to, when executed by the at least one processor, cause the apparatus to support, for a port, an initiation of a logical shutdown of the port and an initiation of a physical shutdown of the port and perform, after the initiation of the logical shutdown of the port and before the initiation of the physical shutdown of the port, at least one function for the port. In at least some example embodiments, the port is associated with a virtual switch configured to operate based on software defined networking. In at least some example embodiments, to support the initiation of the logical shutdown of the port, the set of instructions is configured to, when executed by the at least one processor, cause the apparatus to initiate the logical shutdown of the port based on an indication of a port shutdown command. In at least some example embodiments, to support the initiation of the logical shutdown of the port, the set of instructions is configured to, when executed by the at least one processor, cause the apparatus to initiate the logical shutdown of the port in a control plane of a software defined network. In at least some example embodiments, to support the initiation of the logical shutdown of the port, the set of instructions is configured to, when executed by the at least one processor, cause the apparatus to send, by a virtual switch hosting the port toward a network controller, a message indicative of the logical shutdown of the port. In at least some example embodiments, the at least one function for the port includes least one of continuing to handle data packets traversing the port or rejecting a message from a link discovery protocol. In at least some example embodiments, to perform the at least one function for the port, the set of instructions is configured to, when executed by the at least one processor, cause the apparatus to reject a message of a link discovery protocol. In at least some example embodiments, to perform the at least one function for the port, the set of instructions is configured to, when executed by the at least one processor, cause the apparatus to continue handling data packets traversing the port. In at least some example embodiments, to support the initiation of the physical shutdown of the port, the set of instructions is configured to, when executed by the at least one processor, cause the apparatus to initiate the physical shutdown of the port based on a determination that no additional data packets need to traverse the port. In at least some example embodiments, to support the initiation of the physical shutdown of the port, the set of instructions is configured to, when executed by the at least one processor, cause the apparatus to initiate the physical shutdown of the port based on a determination that no data packets need to traverse the port. In at least some example embodiments, to make the determination that no data packets need to traverse the port, the set of instructions is configured to, when executed by the at least one processor, cause the apparatus to monitor a packet queue of the port. In at least some example embodiments, to support the initiation of the physical shutdown of the port, the set of instructions is configured to, when executed by the at least one processor, cause the apparatus to initiate the physical shutdown of the port based on a determination that the packet queue of the port is empty. In at least some example embodiments, to support the initiation of the physical shutdown of the port, the set of instructions is configured to, when executed by the at least one processor, cause the apparatus to initiate the physical shutdown of the port based on a determination that the packet queue of the port is empty for a threshold length of time. In at least some example embodiments, to support the initiation of the physical shutdown of the port, the set of instructions is configured to, when executed by the at least one processor, cause the apparatus to initiate a removal of the port from a virtual switch. In at least some example embodiments, to support the initiation of the physical shutdown of the port, the set of instructions is configured to, when executed by the at least one processor, cause the apparatus to call, at a virtual switch hosting the port, a function configured to destroy the port. In at least some example embodiments, the port is associated with a software switch. In at least some example embodiments, the software switch is an OpenFlow Virtual Switch (OVS). In at least some example embodiments, the at least one function is provided between a connmrg_send_port_status function and an ofport_destroy function.

In at least some example embodiments, a non-transitory computer-readable medium includes a set of instructions configured to cause an apparatus to support, for a port, an initiation of a logical shutdown of the port and an initiation of a physical shutdown of the port and perform, after the initiation of the logical shutdown of the port and before the initiation of the physical shutdown of the port, at least one function for the port. In at least some example embodiments, the port is associated with a virtual switch configured to operate based on software defined networking. In at least some example embodiments, to support the initiation of the logical shutdown of the port, the set of instructions is configured to cause the apparatus to initiate the logical shutdown of the port based on an indication of a port shutdown command. In at least some example embodiments, to support the initiation of the logical shutdown of the port, the set of instructions is configured to cause the apparatus to initiate the logical shutdown of the port in a control plane of a software defined network. In at least some example embodiments, to support the initiation of the logical shutdown of the port, the set of instructions is configured to cause the apparatus to send, by a virtual switch hosting the port toward a network controller, a message indicative of the logical shutdown of the port. In at least some example embodiments, the at least one function for the port includes least one of continuing to handle data packets traversing the port or rejecting a message from a link discovery protocol. In at least some example embodiments, to perform the at least one function for the port, the set of instructions is configured to cause the apparatus to reject a message of a link discovery protocol. In at least some example embodiments, to perform the at least one function for the port, the set of instructions is configured to cause the apparatus to continue handling data packets traversing the port. In at least some example embodiments, to support the initiation of the physical shutdown of the port, the set of instructions is configured to cause the apparatus to initiate the physical shutdown of the port based on a determination that no additional data packets need to traverse the port. In at least some example embodiments, to support the initiation of the physical shutdown of the port, the set of instructions is configured to cause the apparatus to initiate the physical shutdown of the port based on a determination that no data packets need to traverse the port. In at least some example embodiments, to make the determination that no data packets need to traverse the port, the set of instructions is configured to cause the apparatus to monitor a packet queue of the port. In at least some example embodiments, to support the initiation of the physical shutdown of the port, the set of instructions is configured to cause the apparatus to initiate the physical shutdown of the port based on a determination that the packet queue of the port is empty. In at least some example embodiments, to support the initiation of the physical shutdown of the port, the set of instructions is configured to cause the apparatus to initiate the physical shutdown of the port based on a determination that the packet queue of the port is empty for a threshold length of time. In at least some example embodiments, to support the initiation of the physical shutdown of the port, the set of instructions is configured to cause the apparatus to initiate a removal of the port from a virtual switch. In at least some example embodiments, to support the initiation of the physical shutdown of the port, the set of instructions is configured to cause the apparatus to call, at a virtual switch hosting the port, a function configured to destroy the port. In at least some example embodiments, the port is associated with a software switch. In at least some example embodiments, the software switch is an OpenFlow Virtual Switch (OVS). In at least some example embodiments, the at least one function is provided between a connmrg_send_port_status function and an ofport_destroy function.

In at least some example embodiments, a method includes supporting, for a port, an initiation of a logical shutdown of the port and an initiation of a physical shutdown of the port and performing, after the initiation of the logical shutdown of the port and before the initiation of the physical shutdown of the port, at least one function for the port. In at least some example embodiments, the port is associated with a virtual switch configured to operate based on software defined networking. In at least some example embodiments, supporting the initiation of the logical shutdown of the port includes initiating the logical shutdown of the port based on an indication of a port shutdown command. In at least some example embodiments, supporting the initiation of the logical shutdown of the port includes initiating the logical shutdown of the port in a control plane of a software defined network. In at least some example embodiments, supporting the initiation of the logical shutdown of the port includes sending, by a virtual switch hosting the port toward a network controller, a message indicative of the logical shutdown of the port. In at least some example embodiments, the at least one function for the port includes least one of continuing to handle data packets traversing the port or rejecting a message from a link discovery protocol. In at least some example embodiments, performing the at least one function for the port includes rejecting a message of a link discovery protocol. In at least some example embodiments, performing the at least one function for the port includes continuing handling data packets traversing the port. In at least some example embodiments, supporting the initiation of the physical shutdown of the port includes initiating the physical shutdown of the port based on a determination that no additional data packets need to traverse the port. In at least some example embodiments, supporting the initiation of the physical shutdown of the port includes initiating the physical shutdown of the port based on a determination that no data packets need to traverse the port. In at least some example embodiments, making the determination that no data packets need to traverse the port includes monitoring a packet queue of the port. In at least some example embodiments, supporting the initiation of the physical shutdown of the port includes initiating the physical shutdown of the port based on a determination that the packet queue of the port is empty. In at least some example embodiments, supporting the initiation of the physical shutdown of the port includes initiating the physical shutdown of the port based on a determination that the packet queue of the port is empty for a threshold length of time. In at least some example embodiments, supporting the initiation of the physical shutdown of the port includes initiating a removal of the port from a virtual switch. In at least some example embodiments, supporting the initiation of the physical shutdown of the port includes calling, at a virtual switch hosting the port, a function configured to destroy the port. In at least some example embodiments, the port is associated with a software switch. In at least some example embodiments, the software switch is an OpenFlow Virtual Switch (OVS). In at least some example embodiments, the at least one function is provided between a connmrg_send_port_status function and an ofport_destroy function.

In at least some example embodiments, an apparatus includes means for supporting, for a port, an initiation of a logical shutdown of the port and an initiation of a physical shutdown of the port and means for performing, after the initiation of the logical shutdown of the port and before the initiation of the physical shutdown of the port, at least one function for the port. In at least some example embodiments, the port is associated with a virtual switch configured to operate based on software defined networking. In at least some example embodiments, the means for supporting the initiation of the logical shutdown of the port includes means for initiating the logical shutdown of the port based on an indication of a port shutdown command. In at least some example embodiments, the means for supporting the initiation of the logical shutdown of the port includes means for initiating the logical shutdown of the port in a control plane of a software defined network. In at least some example embodiments, the means for supporting the initiation of the logical shutdown of the port includes means for sending, by a virtual switch hosting the port toward a network controller, a message indicative of the logical shutdown of the port. In at least some example embodiments, the at least one function for the port includes least one of continuing to handle data packets traversing the port or rejecting a message from a link discovery protocol. In at least some example embodiments, the means for performing the at least one function for the port includes means for rejecting a message of a link discovery protocol. In at least some example embodiments, the means for performing the at least one function for the port includes means for continuing handling data packets traversing the port. In at least some example embodiments, the means for supporting the initiation of the physical shutdown of the port includes means for initiating the physical shutdown of the port based on a determination that no additional data packets need to traverse the port. In at least some example embodiments, the means for supporting the initiation of the physical shutdown of the port includes means for initiating the physical shutdown of the port based on a determination that no data packets need to traverse the port. In at least some example embodiments, the means for making the determination that no data packets need to traverse the port includes means for monitoring a packet queue of the port. In at least some example embodiments, the means for supporting the initiation of the physical shutdown of the port includes means for initiating the physical shutdown of the port based on a determination that the packet queue of the port is empty. In at least some example embodiments, the means for supporting the initiation of the physical shutdown of the port includes means for initiating the physical shutdown of the port based on a determination that the packet queue of the port is empty for a threshold length of time. In at least some example embodiments, the means for supporting the initiation of the physical shutdown of the port includes means for initiating a removal of the port from a virtual switch. In at least some example embodiments, the means for supporting the initiation of the physical shutdown of the port includes means for calling, at a virtual switch hosting the port, a function configured to destroy the port. In at least some example embodiments, the port is associated with a software switch. In at least some example embodiments, the software switch is an OpenFlow Virtual Switch (OVS). In at least some example embodiments, the at least one function is provided between a connmrg_send_port_status function and an ofport_destroy function.

BRIEF DESCRIPTION OF THE DRAWINGS

The teachings herein can be readily understood by considering the following detailed description in conjunction with the accompanying drawings, in which:

FIG. 3 depicts an example embodiment of source code configured to support safe removal of a port from a virtual switch where the virtual switch is an OpenFlow Virtual Switch;

FIG. 4 depicts an example embodiment of source code configured to support safe removal of a port from a virtual switch where the virtual switch is an OpenFlow Virtual Switch;

To facilitate understanding, identical reference numerals have been used herein, wherever possible, in order to designate identical elements that are common among the various figures.

DETAILED DESCRIPTION

Various example embodiments for supporting safe port removal are presented. Various example embodiments for supporting safe port removal may be configured to support safe port removal for a port of a virtual switch. Various example embodiments for supporting safe port removal for a port of a virtual switch may be configured to support safe removal of the port of the virtual switch such that the port is no longer available for use on the virtual switch. Various example embodiments for supporting safe port removal for a port of a virtual switch may be configured to support safe removal of the port of the virtual switch by performing separate logical and physical shutdowns of the port and performing one or more functions between the logical and physical shutdowns of the port. Various example embodiments for supporting safe port removal for a port of a virtual switch may be configured to support safe removal of the port of the virtual switch by performing a logical shutdown of the port (e.g., in the control plane of the network, such as by informing a network controller of the shutdown of the port), performing one or more functions for the port (e.g., rejecting link discovery packets received at the port, continuing to handle data packets received at the port, or the like, as well as various combinations thereof), and performing a physical shutdown of the port (e.g., in the data plane, such as by inactivating the port on the virtual switch or destroying the port from the virtual switch). Various example embodiments for supporting safe port removal for a port of a virtual switch may be configured to support safe removal of the port of the virtual switch by supporting an initiation of a logical shutdown of the port (e.g., based on sending of one or more messages toward a control plane) and an initiation of a physical shutdown of the port (e.g., based on one or more operations performed in the data plane) and performing, after the initiation of the logical shutdown of the port and before the initiation of the physical shutdown of the port, at least one function for the port (e.g., rejecting link discovery packets received at the port, continuing to handle data packets received at the port, or the like, as well as various combinations thereof). Various example embodiments for supporting safe port removal for a port of a virtual switch may be configured to support safe port removal for the port of the virtual switch where the virtual switch may be associated with a software defined network (SDN) which may be based on various SDN technologies, such as OpenFlow, Network Configuration Protocol (NetConf), RestConf, or the like, as well as various combinations thereof. It will be appreciated that these as well as various other example embodiments, and associated advantages or potential advantages, of supporting safe port removal may be further understood by considering the communication system presented in FIG. 1.

Figure 1:
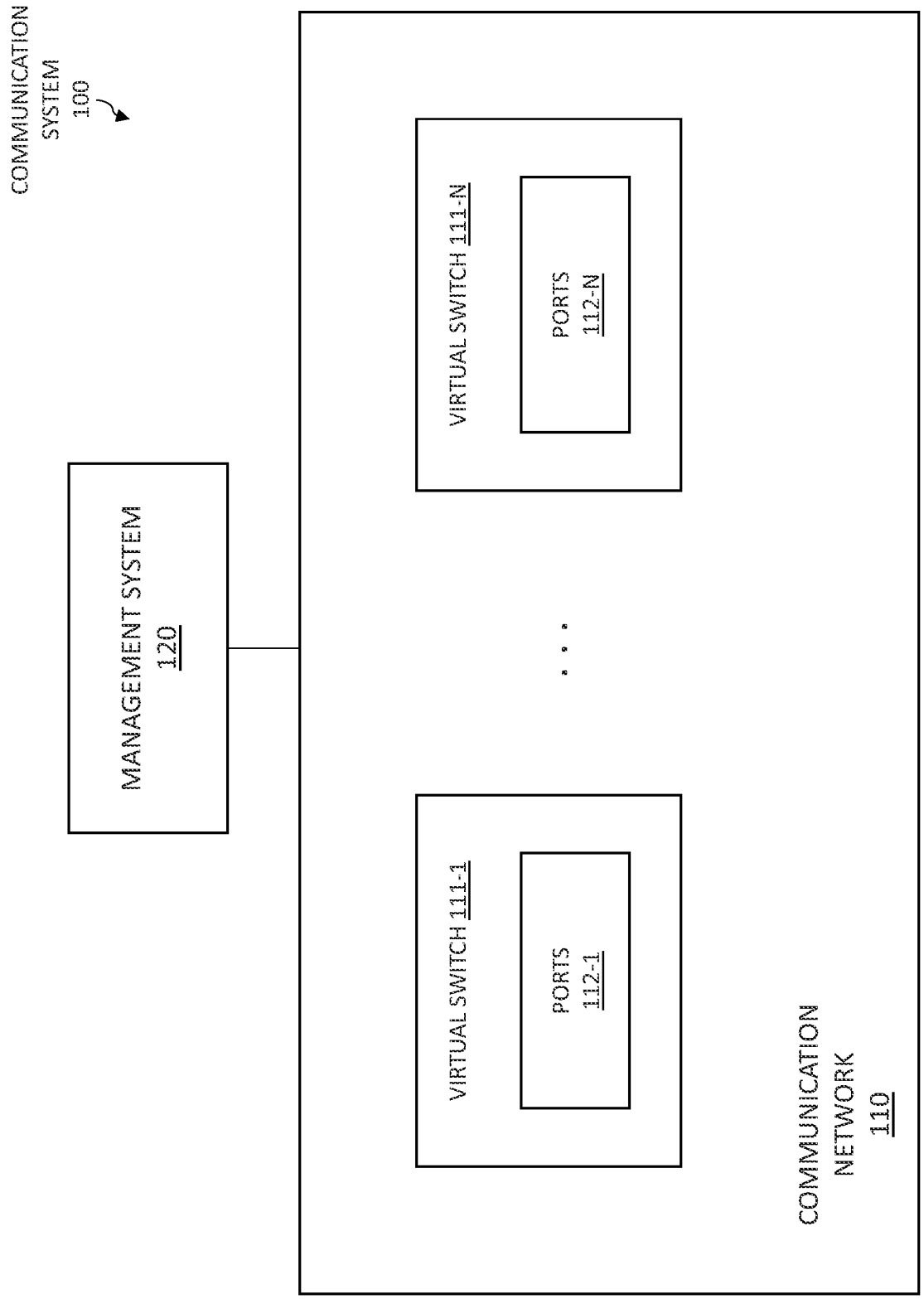
FIG. 1 depicts an example embodiment of a communication system for illustrating various example embodiments of safe port removal.

FIG. 1 depicts an example embodiment of a communication system for illustrating various example embodiments of safe port removal.

The communication system 100 includes a communication network 110 and a management system 120. The communication system 110 includes a set of virtual switches 111-1-111-N (collectively, virtual switches 111). The virtual switches 111-1-111-N include sets of ports 112-1-112-N (collectively, ports 112), respectively, where it will be appreciated that, for each of the virtual switches 111, the set of ports 112 may include one or more ports. The virtual switches 111, and the associated sets of ports 112 of the virtual switches 111, may be supported by underlying physical resources configured to host the virtual switches 111 (e.g., processor resources, memory resources, storage resources, input-output resources, or the like, as well as various combinations thereof). The communication network 110 and management system 120 may be configured to support use of virtual switches based on use of software defined networking (SDN), which may be based on various SDN technologies (e.g., OpenFlow, NetConf, RestConf, or the like, as well as various combinations thereof). It will be appreciated that, although primarily presented herein within the context of example embodiments in which the communication system 100 is based on a specific type of virtualization technology (namely, using SDN that is based on OpenFlow such that the virtual switches 111 may be referred to as OpenFlow Virtual Switches (OVSs)), the communication system 100 may be based on various other types of SDN-based technologies (e.g., NetConf, RestConf, or the like), the communication system 100 may be based on various other types of virtualization technologies, or the like, as well as various combinations thereof. It will be appreciated that the communication system 100 may include various other elements, functions, or the like, as well as various combinations thereof.

The communication system 100 may be configured to support dynamic resource management. The communication system 100 may be configured to support dynamic management of physical resources which support virtual resources, dynamic management of virtual resources, or the like, as well as various combinations thereof. The communication system 100 may be configured to support dynamic addition (creation) and removal (termination) of virtual resources (e.g., virtual switches 111, ports 112 of virtual switches 111, or the like, as well as various combinations thereof). The communication system 100 may be configured to support dynamic addition of virtual switches 111 (e.g., adding new virtual switches 111 in response to increased traffic load or the like) and removal of virtual switches 111 (e.g., removing existing virtual switches 111 in response to decreased traffic load or the like). The communication system 100 may be configured to support dynamic addition of ports 112 to virtual switches 111 (e.g., based on a determination that the port 112 is needed, such as when a new host is instantiated and connected to the virtual switch 111) and removal of ports 112 from virtual switches 111 (e.g., based on a determination that the port 112 is no longer needed, such as when an existing host is disconnected from the virtual switch 111 and terminated). The addition of a port 112 to a virtual switch 111 or removal of a port 112 from a virtual switch 111 may be initiated by the virtual switch 111, the management system 120, or the like. The dynamic management of resources within the communication system 100 may be supported based on messaging between the management system 120 and the communication system 110.

The communication system 100 may be configured to support safe removal of ports 112 from virtual switches 111. The safe removal of a port 112 from a virtual switch 111 may be initiated at the virtual switch 111 (e.g., by the virtual switch 111 or by the port 112) in response to a determination that the port 112 is to be removed from the virtual switch 111. The safe removal of a port 112 from a virtual switch 111 may be performed by performing separate logical and physical shutdowns of the port 112. The safe removal of a port 112 from a virtual switch may be performed by performing at least one function for the port 112 between the logical shutdown of the port 112 and the physical shutdown of the port 112 (e.g., at least one protection function configured to protect against problems associated with removal of the port 112 and, thus, provide safe removal of the port 112 from the virtual switch 111). The safe removal of a port 112 from a virtual switch 111 may be performed by performing the logical shutdown of the port 112, performing at least one function for the port 112 after the logical shutdown of the port 112 and before the physical shutdown of the port 112, and then performing the physical shutdown of the port 112. The various functions performed at the virtual switch 111 for supporting safe removal of the port 112 from the virtual switch 111 (e.g., functions performed by the virtual switch 111 on behalf of the port 112, by the port 112, or the like, as well as various combinations thereof) are discussed further below.

The safe removal of a port 112 from a virtual switch 111, as indicated above, may be initiated at the virtual switch 111 (e.g., by the virtual switch 111 or by the port 112) in response to a determination that the port 112 is to be removed from the virtual switch 111. The safe removal of the port 112 from the virtual switch 111 may be initiated at the virtual switch 111 based on a local determination at the virtual switch 111 that the port 112 is no longer needed. The safe removal of the port 112 from the virtual switch 111 may be initiated at the virtual switch 111 based on receipt by the virtual switch 111 of a request for removal of the port 112 from the virtual switch 111 received remotely from the management system 120 (e.g., based on a local determination at the management system 120 that the port 112 is no longer needed, based on a request for removal of the port 112 that is received at the management system 120, or the like). It will be appreciated that, although primarily presented with respect to example embodiments in which the removal of the port 112 from the virtual switch 111 is initiated at the virtual switch 111 (e.g., by the virtual switch 111 or by the port 112), in at least some example embodiments the removal of the port 112 from the virtual switch 111 may be initiated by a different element (e.g., based on messages provided to both the virtual switch 111 and the management system 120 to inform the virtual switch 111 and the management system 120 of the removal of the port 112).

The safe removal of a port 112 from a virtual switch 111, as indicated above, may include performing a logical shutdown of the port. The logical shutdown of the port 112 may be initiated in response to receiving a request for removal of the port 112. The logical shutdown of the port 112 may be initiated by sending a message to the control plane (e.g., to the management system 120) where the message is indicative of the logical shutdown of the port 112. For example, when the virtual switch 111 receives a shutdown command for the port 112, the virtual switch 111 may send a port status change notification message to the management system 120 to notify the management system 120 of the port status change of the port 112. For example, when the port 112 receives a shutdown command, the port 112 may send a port status change notification message to the management system 120 to notify the management system 120 of the port status change of the port 112. The control plane, upon receiving the message indicative of the logical shutdown of the port 112, may update one or more control plane applications (e.g., a topology application, a routing planning application, or the like, as well as various combinations thereof) regarding the logical shutdown of the port. The one or more control plane applications, based on the indication of the logical shutdown of the port 112, may take one or more actions such that the port 112 becomes unavailable for the control plane (e.g., deleting the port 112 such that the port 112 is no longer available for control plane functions, marking the port 112 so that the port 112 is invisible and not considered to be available for control plane functions, or the like). The logical shutdown of the port 112 may include various other functions which may be performed by the port 112, the virtual switch 111, the control plane (e.g., management system 120), or the like, as well as various combinations thereof).

The safe removal of a port 112 from a virtual switch 111, as indicated above, may include performing at least one protection function for the port 112 after the logical shutdown of the port 112 and before the physical shutdown of the port 112. The port 112, while logically shut down in the control plane, remains active in the data plane. The port 112 rejects discovery protocols, which may include discovery protocols related to control plane functions. For example, the port 112 may reject messages of link discovery protocols (e.g., Link Layer Discovery Protocol (LLDP), Bidirectional Forwarding Detection (BFD), or the like) or other types of discovery protocols. The port 112 monitors packets traversing the port for determining when to initiate the physical shutdown of the port 112. For example, the port 112 may check packets which traverse the port 112 and, based on a determination that no additional packets need the port 112 (e.g., no additional packets remain in the queue(s) for the port 112), may initiate the physical shutdown of the port. It will be appreciated that the protection functions may be applied at the port 112, by the virtual switch 111 for the port 112, or the like, as well as various combinations thereof. It will be appreciated that various other protection functions may be performed for the port 112 after the logical shutdown of the port 112 and before the physical shutdown of the port 112.

The safe removal of a port 112 from a virtual switch 111, as indicated above, may include performing the physical shutdown of the port 112 after performing the one or more protection functions for the port 112. The physical shutdown of the port 112 may be initiated by calling a function to inactivate the port 112 in the data plane such that the port 112 is no longer available for use on the virtual switch 111. The physical shutdown of the port 112 may be initiated by calling a function to destroy the port 112 such that the port 112 no longer exists on the virtual switch 111. The physical shutdown of the port 112 may include deactivating or removing the processing function that performs the one or more protection functions for the port 112 before calling a function to destroy the port 112. The physical shutdown of the port 112 may include various other functions which may be performed by the port 112, the virtual switch 111, or the like, as well as various combinations thereof).

It will be appreciated that various functions presented as being performed by the port 112 for supporting safe removal of the port 112 from the virtual switch 111 also or alternatively may be performed by the virtual switch 111 on behalf of the port 112 (e.g., the virtual switch 111 may support one or more functions configured to keep the port 112 working in the data plane after the logical shutdown of the port 112 in the data plane, including performing one or more protection functions, until initiating physical shutdown of the port 112 when the port 112 is no longer needed in the data plane).

It will be appreciated that the one or more protection functions may be performed after logical shutdown of the port is initiated (e.g., before the logical shutdown of the port is considered to be completed in the control plane) and before physical shutdown of the port is initiated (e.g., before the physical shutdown of the port is considered to be started in the data plane).

Figure 2:
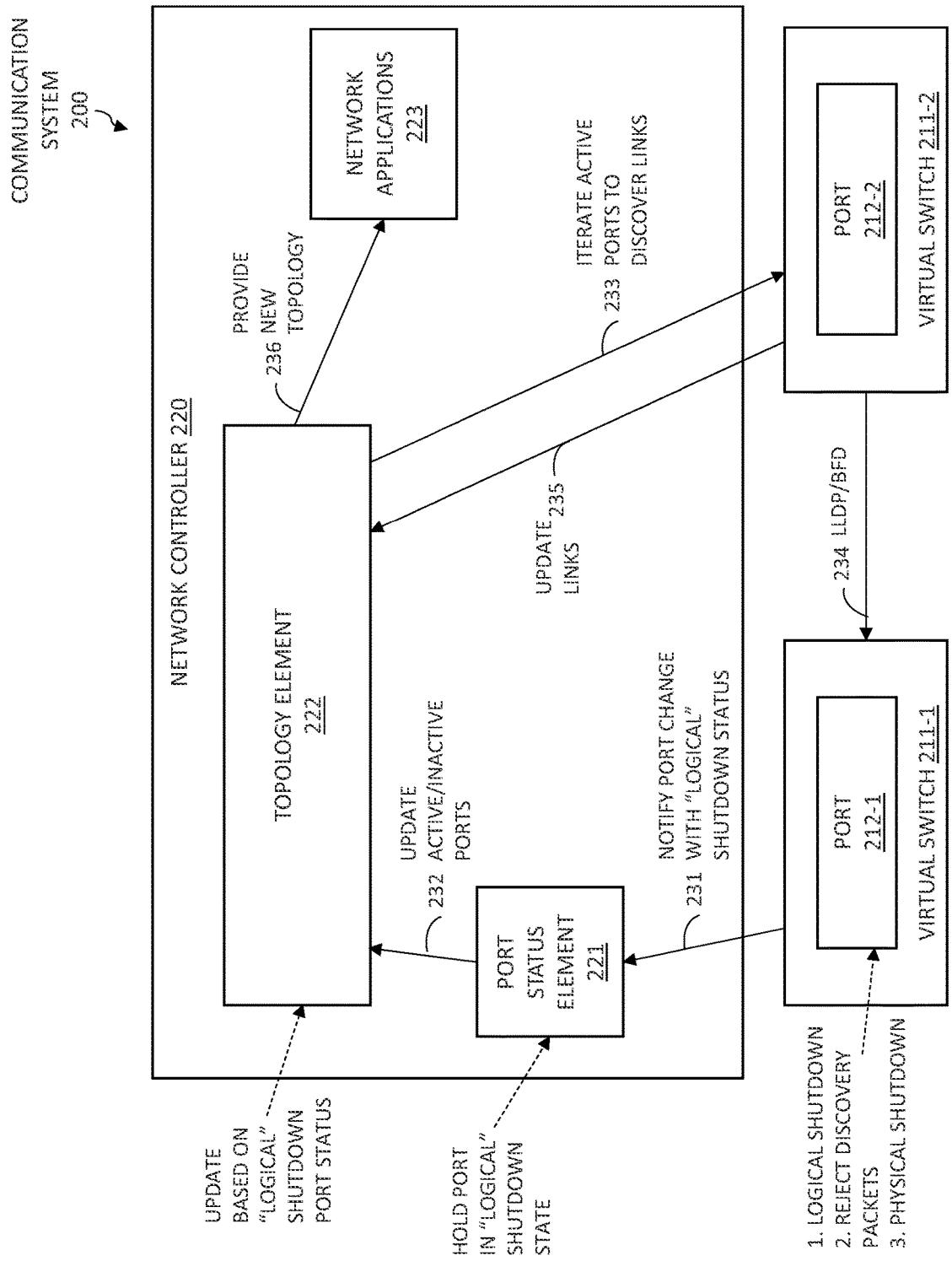
FIG. 2 depicts an example embodiment of a communication system for illustrating a process flow for safe removal of a port from a virtual switch.

It will be appreciated that the safe removal of a port 112 from a virtual switch 111 may be further understood by way of reference to FIG. 2, which presents example embodiments for safe removal of a port from a virtual switch in an SDN-based network using OpenFlow.

FIG. 2 depicts an example embodiment of a communication system for illustrating a process flow for safe removal of a port from a virtual switch.

In FIG. 2, the communication system 200 includes a pair of virtual switches 211-1 and 211-2 (collectively, virtual switches 211) and a network controller 220. The virtual switches 211-1 and 211-2 include ports 212-1 and 212-2 (collectively, ports 212), respectively. The network controller 220 includes a port status element 221, a topology element 222, and network applications 223. The port status element 221 is configured to maintain the current status of ports of virtual switches in the network (illustratively, the ports 212 of the virtual switches 211). The topology element 222 is configured to maintain the current topology of the network. The network applications 223 may include various types of applications which may support functions in the network (e.g., path computation applications, service provisioning applications, or the like, as well as various combinations thereof).

In FIG. 2, the port 212-1 of the virtual switch 211-1 is going to be removed from the virtual switch 211-1 using the process for safe port removal. In process of FIG. 2, it is assumed that the port 212-1 has received a notification that the port 212-1 is going to be removed from the virtual switch 211-1.

At step 231, the virtual switch 211-1 initiates a logical shutdown of the port 212-1 by sending a notification message to the network controller 220. The notification message is configured to indicate the logical shutdown of the port to the network controller 220. The virtual switch 211-1 may send the notification message to the network controller 220 via the southbound interface between the network controller 220 and the virtual switch 211-1. The notification message is received by the port status element 221 of the network controller 220, which changes the status of the port 212-1 from the "active" state to the "logical shutdown" state. The port status element 221 of the network controller 220 then holds the port 212-1 in the "logical shutdown" state. The virtual switch 211-1, on the other hand, holds the port 212-1 in the "active" state in the data plane in order to allow the port 212-1 to keep working in the data plane.

At step 232, the port status element 221 of the network controller 220 updates the topology element 222 of the network controller 220 regarding active/inactive ports. The port status element 221 of the network controller 220 may send a message to the topology element 222 of the network controller 220 indicative that the port 212-1 has changed from the "active" state to the "logical shutdown" state. The topology element 222 of the network controller 220 updates the topology of the network such that the port 212-1 becomes unavailable or invisible from the view of the control plane. The topology element 222 of the network controller 220 also re-plans the routing in the network based on the updated topology of the network. It will be appreciated that the topology element 222 of the network controller 220 may perform other functions based on the indication that the port 212-1 has changed from the "active" state to the "logical shutdown" state.

At step 233, the topology element 222 of the network controller 220 initiates a process for discovery of network links. The topology element 222 of the network controller 220 may initiate the process for discovery of network links by sending link discovery request messages to virtual switches for causing the virtual switches to initiate link discovery protocols such as LLDP or other suitable types of discovery protocols. In the example of FIG. 2, the topology element 222 of the network controller 220 sends a link discovery request message to the virtual switch 211-2 which causes the virtual switch 211-2 to send link discovery packets; however, it will be appreciated that the topology element 222 of the network controller 220 also may send link discovery request messages to other virtual switches (which have been omitted from FIG. 2 for purposes of clarity).

At step 234, the virtual switch 211-2, in response to the link discovery request message from the topology element 222 of the network controller 220, initiates a link discovery process. The virtual switch 211-2 initiates the link discovery process by sending link discovery protocol messages to neighboring switches. In the example of FIG. 2, the virtual switch 211-2 sends link discovery protocol messages (e.g., LLDP/BFD packets in the example of FIG. 2) toward the virtual switch 211-1 by directing the link discovery protocol messages to the port 212-1 of the virtual switch 211-1. It will be appreciated that, although primarily presented with respect to use of LLDP/BFD for link discovery, various other link discovery protocols also or alternatively may be used for link discovery.

At step 234, the port 212-1 of the virtual switch 211-1 receives the link discovery protocol messages from the virtual switch 211-2. The port 212-1 is in the process of being removed from the virtual switch 211-1 and, as indicated above, is inactive in the control plane while remaining active in the data plane. The port 212-1, since it is in the process of being removed, rejects the link discovery protocol messages from the virtual switch 211-2 (e.g., ignoring the link discovery protocol messages, dropping the link discovery protocol messages, or the like, as well as various combinations thereof) and, thus, does not respond to the link discovery protocol messages from the virtual switch 211-2, thereby preventing learning of the link associated with the port 212-1 in the control plane. The port 212-1, however, since it is still active in the data plane, continues to support forwarding of data packets until the data packets that need the port 212-1 have been forwarded by the port 212-1.

At step 235, the topology element 222 of the network controller 220, in response to the link discovery process initiated by the topology element 222 of the network controller 220, receives link information from virtual switches and updates the topology of the network based on the link information from the virtual switches. In the example of FIG. 2, the virtual switch 211-2 sends a link discovery response message, including link information obtained by the virtual switch 211-2 based on the link discovery process, to the topology element 222 of the network controller 220. The virtual switch 211-2 sends a link discovery response message to the topology element 222 of the network controller 220 based on the results of the link discovery process performed by the virtual switch 211-2 (e.g., based on link discovery protocol response messages received from neighboring virtual switches of the virtual switch 211-2). It will be appreciated that the link discovery response message sent by the virtual switch 211-2, even though the port 211-1 is still active in the data plane at the virtual switch 211-1, will not include link information associated with the port 211-1 due to the rejection by the port 211-1 of the link discovery protocol messages from the virtual switch 211-2.

At step 236, the topology element 222 of the network controller 220 provides the updated topology information, indicative of the updated topology of the network, to the network applications 223 of the network controller 220. The network applications 223 of the network controller 220, as indicated above, may include various types of network applications which may be supported by the network controller 220 (e.g., path computation applications, service provisioning applications, or the like, as well as various combinations thereof) and, thus, which may make use of network topology information for performing various network control functions (e.g., path computation functions, service provisioning functions, or the like, as well as various combinations thereof).

As indicated in FIG. 2, while the network continues to operate and the port 212-1 is inactive in the control plane, the port 212-1 remains active in the data plane until the port 212-1 can be safely removed from the virtual switch 211-1. The port 212-1, while active in the data plane, may performed various functions (at least some of which may be referred to herein as security functions since such functions provide secure, or safe, port removal). For example, while active in the data plane prior to initiation of physical shutdown, the port 212-1 may reject link discovery messages. For example, while active in the data plane prior to initiation of physical shutdown, the port 212-1 may continue to handle data packets until the virtual switch 211-1 confirms that no additional data packets require the use of the port 212-1 (e.g., based on a determination that no data packets remain in the queue(s) of the port 212-1). The virtual switch 211-1, based on a determination that the physical shutdown of the port 211-1 may be initiated (e.g., based on a determination that no additional data packets require the use of the port 212-1), initiates the physical shutdown of the port 212-1 such that the port 212-1 is no longer available for use on the virtual switch 211-1 (e.g., the port 212-1 may be deactivated on the virtual switch 211-1, destroyed from the virtual switch 211-1, or the like, as well as various combinations thereof).

It will be appreciated that the various functions presented with respect to FIG. 2 for supporting safe removal of ports from virtual switches may be performed in various other ways (e.g., functions may be distributed across the elements differently for supporting safe removal of ports from virtual switches, other functions may be performed for supporting safe removal of ports from virtual switches, or the like, as well as various combinations thereof).

FIG. 3 depicts an example embodiment of source code configured to support safe removal of a port from a virtual switch where the virtual switch is an OVS. As illustrated in FIG. 3, one of the operations in the "reason" field of OpenFlow message "ofp_port_status" indicates the notification of "DELETE" port, which is implemented in OVS by the function "connmgr_send_port_status( . . . )" with the argument "uint8_t reason". The OVS function "connmgr_send_port_status( . . . )" with the argument "OFPPR_DELETE" may be used for notifying the port status change to the control plane with an OpenFlow message when calling the function "ofport_remove( . . . )" to delete the port in the control plane before destroying the port by the function "ofport_destroy( . . . )" in the data plane. In other words, in the function "ofport_remove( )", the "connmgr_send_port_status( . . . )" is the "logical" port shutdown because it notifies the controller of the de-activation of a port and the "ofport_destroy( . . . )" is the "physical" port shutdown because it removes the port from OVS. Accordingly, in at least some example embodiments (an example of which is presented in FIG. 4), the protection mechanism which is used to support safe removal of the port (e.g., supporting protection functions such as rejection of link discovery, continued handling of data packets in the data plane, and so forth) can be added between the two functions "connmgr_send_port_status( . . . )" and "ofport_destroy ( . . . )". It will be appreciated that the protection functions which are used to support safe removal of the port may be introduced in various other ways.

FIG. 4 depicts an example embodiment of source code configured to support safe removal of a port from a virtual switch where the virtual switch is an OpenFlow Virtual Switch. As illustrated in FIG. 4, the protection mechanism which is used to support safe removal of the port may be added between the two functions "connmgr_send_port_status( . . . )" and "ofport_destroy( . . . )". The protection mechanism that is added between the two functions "connmgr_send_port_status( . . . )" and "ofport_destroy( . . . )" may be configured to support protection functions such as (1) rejecting the link discovery protocol packets received at the port, such as LLDP or BFD, because the port is logically "de-activated" in the control plane and (2) checking the packets which go through this port in the data plane and, when there are no more packets which go through this port, proceeding to "ofport_destroy( )" to physically remove the port from the OVS. It will be appreciated that the protection mechanism which is used to support safe removal of the port may be introduced in various other ways.

Figure 5:
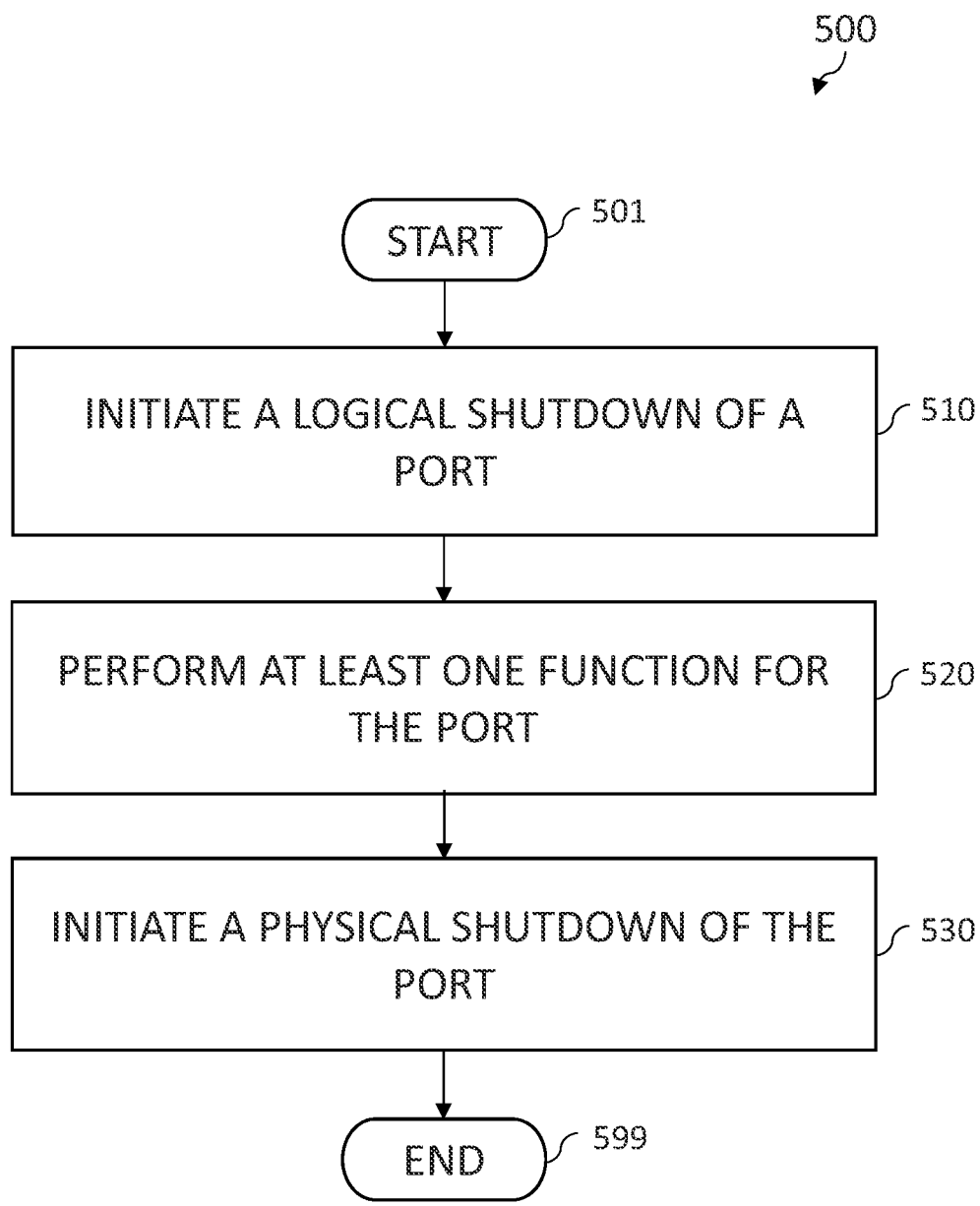
FIG. 5 depicts an example embodiment of a method for supporting safe removal of a port from a virtual switch.

FIG. 5 depicts an example embodiment of a method for supporting safe removal of a port from a virtual switch. It will be appreciated that although primarily presented as being performed serially, at least a portion of the blocks of method 500 may be performed contemporaneously or in a different order than as presented in FIG. 5. At block 501, the method 500 begins. At block 510, initiate a logical shutdown of a port. At block 520, perform at least one function for the port. At block 530, initiate a physical shutdown of the port. At block 599, the method 500 ends.

Figure 6:
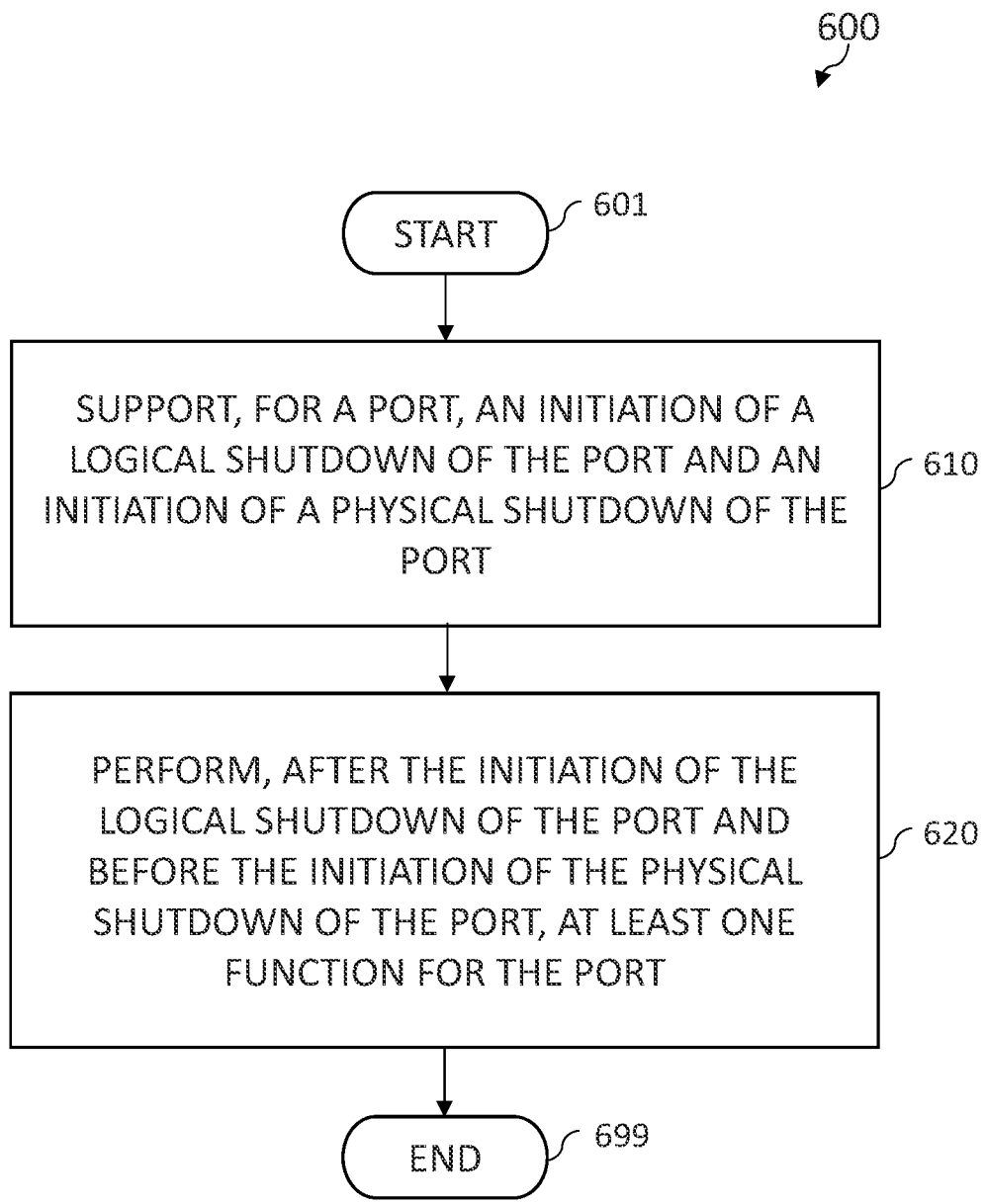
FIG. 6 depicts an example embodiment of a method for supporting safe removal of a port from a virtual switch.

FIG. 6 depicts an example embodiment of a method for supporting safe removal of a port from a virtual switch. It will be appreciated that although primarily presented as being performed serially, at least a portion of the blocks of method 600 may be performed contemporaneously or in a different order than as presented in FIG. 6. At block 601, the method 600 begins. At block 610, support, for a port, an initiation of a logical shutdown of the port and an initiation of a physical shutdown of the port. At block 620, perform, after the initiation of the logical shutdown of the port and before the initiation of the physical shutdown of the port, at least one function for the port. At block 699, the method 600 ends.

Various example embodiments for supporting safe port removal may provide various advantages or potential advantages. For example, various example embodiments for supporting safe port removal may be configured to reduce or even avoid performance degradation during port status change procedures (e.g., avoiding additional latency and packet drops during traffic re-routing and network re-planning after any port status changes in any switches). For example, various example embodiments for supporting safe port removal may be configured to support topology discovery and management in software-defined networks in a manner that supports improved handling of latency sensitive events due to network re-routing or re-planning in response to dynamic topology changes, including support for synchronization of the control plane topology with the data plane topology, thereby enabling support for improvements in various types of latency sensitive networks such as edge cloud networks, industrial automation networks, 5G cellular networks, and so forth. For example, various example embodiments for supporting safe port removal may be configured to support handling of low latency events which might otherwise not be handled as efficiently as link failure recovery solutions and topology discovery solutions. It will be appreciated that various example embodiments for supporting safe port removal may provide various other advantages or potential advantages.

Figure 7:
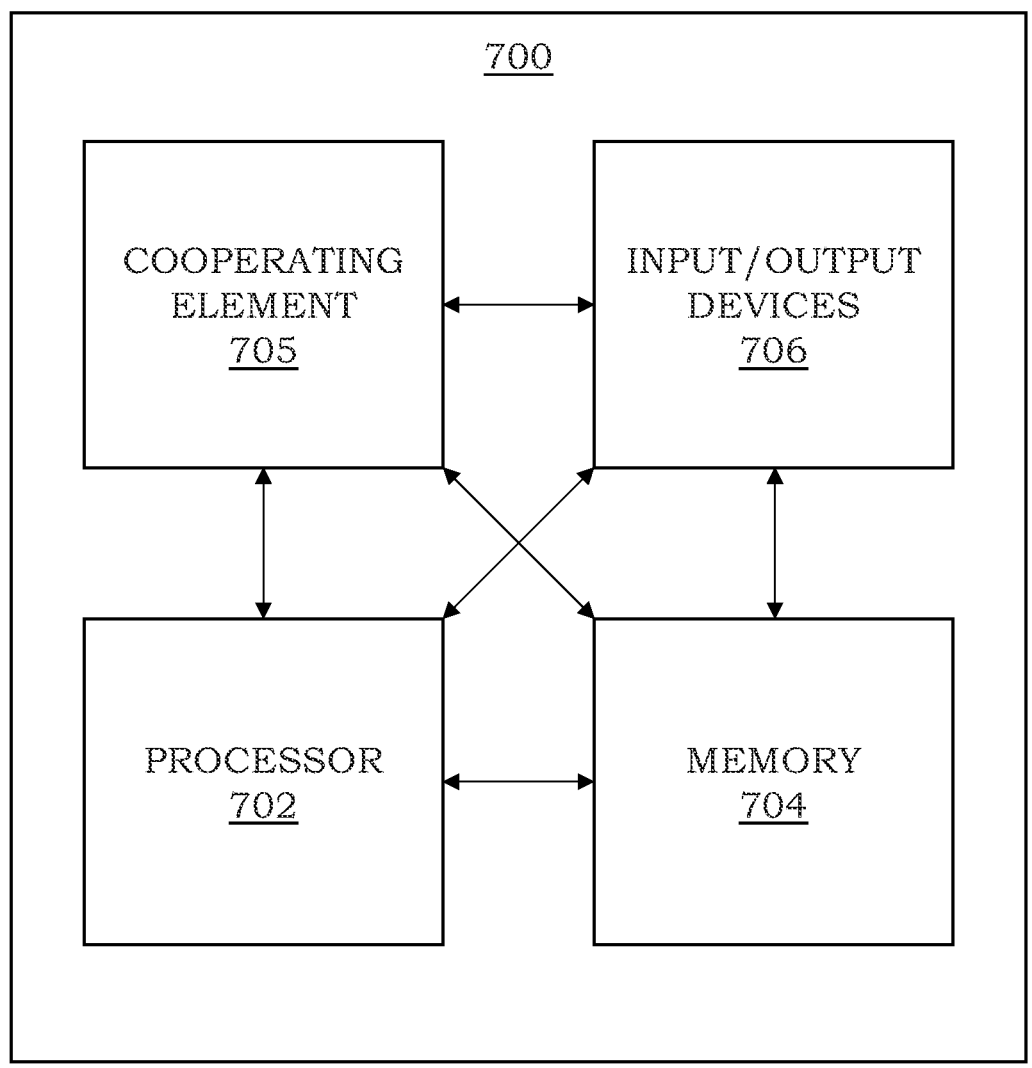
FIG. 7 depicts an example embodiment of a computer suitable for use in performing various functions presented herein.

FIG. 7 depicts an example embodiment of a computer suitable for use in performing various functions presented herein.

The computer 700 includes a processor 702 (e.g., a central processing unit (CPU), a processor, a processor having a set of processor cores, a processor core of a processor, or the like) and a memory 704 (e.g., a random access memory, a read only memory, or the like). The processor 702 and the memory 704 may be communicatively connected. In at least some example embodiments, the computer 700 may include at least one processor and at least one memory including a set of instructions, wherein the set of instructions is configured to, when executed by the at least one processor, cause the computer to perform various functions presented herein.

The computer 700 also may include a cooperating element 705. The cooperating element 705 may be a hardware device. The cooperating element 705 may be a process that can be loaded into the memory 704 and executed by the processor 702 to implement various functions presented herein (in which case, for example, the cooperating element 705 (including associated data structures) can be stored on a non-transitory computer-readable storage medium, such as a storage device or other suitable type of storage element (e.g., a magnetic drive, an optical drive, or the like)).

The computer 700 also may include one or more input/output devices 706. The input/output devices 706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 700 may represent a general architecture and functionality suitable for implementing functional elements described herein, portions of functional elements described herein, or the like, as well as various combinations thereof. For example, computer 700 may provide a general architecture and functionality that is suitable for implementing one or more elements presented herein, such as a network devices (e.g., devices hosting virtual switches or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory storing instructions which, when executed by the at least one processor, cause the apparatus to:
   initiate, by a virtual switch for a port of the virtual switch, a logical shutdown of the port, wherein initiating the logical shutdown of the port includes sending an indication of the logical shutdown of the port from the virtual switch toward a controller while maintaining the port in an active state on the virtual switch; and
   initiate, by the virtual switch based on a determination that a physical shutdown of the port may be initiated, the physical shutdown of the port, wherein the determination that the physical shutdown of the port may be initiated is based on a determination that no additional data packets need to traverse the port.

2. The apparatus of claim 1, wherein the virtual switch is configured to operate based on software defined networking.

3. The apparatus of claim 1, wherein, to initiate the logical shutdown of the port, the instructions, when executed by the at least one processor, cause the apparatus to:
   initiate the logical shutdown of the port based on an indication of a port shutdown command.

4. The apparatus of claim 1, wherein the controller is associated with a control plane of a software defined network.

5. The apparatus of claim 1, wherein the instructions, when executed by the at least one processor, cause the apparatus to:
   perform, by the virtual switch after the initiation of the logical shutdown of the port and before the initiation of the physical shutdown of the port, at least one function for the port.

6. The apparatus of claim 5, wherein the at least one function for the port includes rejecting a message from a link discovery protocol.

7. The apparatus of claim 1, wherein the determination that no additional data packets need to traverse the port is based on monitoring of a packet queue of the port.

8. The apparatus of claim 7, wherein the determination that no additional data packets need to traverse the port is based on a determination that the packet queue of the port is empty.

9. The apparatus of claim 7, wherein the determination that no additional data packets need to traverse the port is based on a determination that the packet queue of the port is empty for a threshold length of time.

10. The apparatus of claim 1, wherein, to initiate the physical shutdown of the port, the instructions, when executed by the at least one processor, cause the apparatus to:
    initiate a removal of the port from the virtual switch.

11. The apparatus of claim 1, wherein, to initiate the physical shutdown of the port, the instructions, when executed by the at least one processor, cause the apparatus to:
    call, at the virtual switch, a function configured to destroy the port.

12. A method, comprising:
    initiating, by a virtual switch for a port of the virtual switch, a logical shutdown of the port, wherein initiating the logical shutdown of the port includes sending an indication of the logical shutdown of the port from the virtual switch toward a controller while maintaining the port in an active state on the virtual switch; and
    initiating, by the virtual switch based on a determination that a physical shutdown of the port may be initiated, the physical shutdown of the port, wherein the determination that the physical shutdown of the port may be initiated is based on a determination that no additional data packets need to traverse the port.

* * * * *